(12) United States Patent
Umapathy et al.

(10) Patent No.: US 10,218,670 B2
(45) Date of Patent: Feb. 26, 2019

(54) PRESENTING TASKS IN EMAIL APPLICATION AND CALENDAR APPLICATION

(71) Applicant: GOOGLE INC., Mountain View, CA (US)

(72) Inventors: Vijay Umapathy, Sunnyvale, CA (US); Alessandro Suraci, Zurich (CH); Robyn D. Coultas, Atherton, CA (US); Cedomir Segulja, Toronto (CA); Federico Asara, London (GB); Scott Andrew Grant, Wandsworth (GB); Xander Pollock, Mountain View, CA (US)

(73) Assignee: Google LLC, Mountain View, CA (US)

( * ) Notice: Subject to any disclaimer, the term of this patent is extended or adjusted under 35 U.S.C. 154(b) by 353 days.

(21) Appl. No.: 14/862,619

(22) Filed: Sep. 23, 2015

(65) Prior Publication Data
US 2017/0085520 A1    Mar. 23, 2017

(51) Int. Cl.
*G06Q 10/10* (2012.01)
*H04L 12/58* (2006.01)
(Continued)

(52) U.S. Cl.
CPC .......... *H04L 51/36* (2013.01); *G06F 3/04842* (2013.01); *G06F 17/30905* (2013.01);
(Continued)

(58) Field of Classification Search
CPC ............. G06Q 10/109; G06Q 10/1095; G06Q 10/1093; G06Q 10/107; G06Q 10/1097; G06F 3/04842
See application file for complete search history.

(56) References Cited

U.S. PATENT DOCUMENTS 6,272,532 B1    8/2001  Feinleib et al.
7,747,966 B2    6/2010  Leukart et al.
(Continued)

OTHER PUBLICATIONS

Gwizdka, et al., "Individual differences 1-22 and task-based user interface evaluation: a case study of pending tasks in email", Interacting With Computers, Butterworth-Heinemann, GB, vol. 16, No. 4, Aug. 1, 2004, pp. 769-797.
(Continued)

*Primary Examiner* — Jennifer N To
*Assistant Examiner* — Amy P Hoang
(74) *Attorney, Agent, or Firm* — Brake Hughes Bellermann LLP

(57) ABSTRACT

A computing system may generate an email application and a calendar application. The email application may be configured to retrieve at least one task from a task database, retrieve at least one email from an email database, and concurrently present the at least one retrieved task and the at least one retrieved email in an email user interface, the at least one retrieved task and the at least one retrieved email being adjacent and non-overlapping within the email user interface. The calendar application may be configured to retrieve the at least one task from the task database, retrieve at least one appointment from an appointment database, and concurrently present the at least one retrieved task and the at least one retrieved appointment in a calendar user interface, the at least one retrieved task and the at least one retrieved appointment being adjacent and non-overlapping within the calendar user interface.

15 Claims, 8 Drawing Sheets

(51) Int. Cl.
G06F 3/0484 (2013.01)
G06F 17/30 (2006.01)
(52) U.S. Cl.
CPC ....... G06Q 10/107 (2013.01); G06Q 10/1093 (2013.01); G06Q 10/1097 (2013.01)

(56) References Cited

U.S. PATENT DOCUMENTS

| | | | | |
|---|---|---|---|---|
| 2003/0135558 A1* | 7/2003 | Bellotti | ................ | G06Q 10/107 709/206 |
| 2006/0069604 A1* | 3/2006 | Leukart | ................ | G06Q 10/109 715/792 |
| 2008/0065460 A1* | 3/2008 | Raynor | .................. | G06Q 10/06 705/7.21 |
| 2008/0155547 A1* | 6/2008 | Weber | .................. | G06Q 10/109 718/102 |
| 2009/0089133 A1 | 4/2009 | Johnson | | |
| 2009/0299810 A1* | 12/2009 | Jardine | ................. | G06Q 10/10 705/7.18 |
| 2015/0046210 A1 | 2/2015 | Shoham et al. | | |
| 2017/0068934 A1* | 3/2017 | Bos | .................... | G06Q 10/1097 |

OTHER PUBLICATIONS

International Search Report and Written Opinion for PCT Application No. PCT/US2016/47373, dated Sep. 30, 2016, 12 pages.

* cited by examiner

| | | | |
|---|---|---|---|
| Task 602 | Title 616 | Date 618 | Done State 620 |
| Task 604 | Title 622 | Date 624 | Done State 626 |
| Email 606 | Title 628 | Date 630 | State 632 |
| Email 608 | Title 634 | Date 636 | State 638 |
| Task 610 | Title 640 | Date 642 | Done State 644 |
| Email 612 | Title 646 | Date 648 | State 650 |
| Task 614 | Title 652 | Date 654 | Done State 656 |

Inbox 600

FIG. 6

| Task 708 | Title 726 | Date 728 | Done 730 | ⎫ Previous |
|---|---|---|---|---|
| Appointment 710 | Title 732 | Date 734 | | ⎭ Day 702 |
| Task 712 | Title 736 | Date 738 | Done 740 | ⎫ |
| Task 714 | Title 742 | Date 744 | Done 746 | |
| Task 716 | Title 748 | Date 750 | Done 752 | ⎬ Current Day 704 |
| Task 718 | Title 754 | Date 756 | Done 758 | |
| Appointment 720 | Title 760 | Date 762 | | ⎭ |
| Task 722 | Title 764 | Date 766 | Done 768 | ⎫ Future Day 706 |
| Appointment 724 | Title 770 | Date 772 | | ⎭ |

Calendar Interface 700

FIG. 7

PRESENTING TASKS IN EMAIL APPLICATION AND CALENDAR APPLICATION

TECHNICAL FIELD

This description relates to presenting tasks in computer applications.

BACKGROUND

Task applications may maintain and present tasks to users. Users may create tasks, and indicate when the tasks has been completed. However, users may forget to visit and/or launch the task application. If the user forgets to visit and/or launch the task application, then the benefit of the task application may be lost.

SUMMARY

A computer system may store tasks in a task database. An email application and a calendar application may access the task database, and they both may present tasks from the task database. The presentation of the tasks by the email application and the calendar application may increase the likelihood that the tasks are seen and acted upon by a user.

A non-transitory computer-readable storage medium may comprise instructions stored thereon for presenting tasks in an email application and a calendar application. The instructions, when executed by at least one processor, may be configured to cause a computing system to at least generate an email application and generate a calendar application. The email application may be configured to retrieve at least one task from a task database, retrieve at least one email from an email database, and concurrently present the at least one retrieved task and the at least one retrieved email in an email user interface, the at least one retrieved task and the at least one retrieved email being adjacent and non-overlapping within the email user interface. The calendar application may be configured to retrieve the at least one task from the task database, retrieve at least one appointment from an appointment database, and concurrently present the at least one retrieved task and the at least one retrieved appointment in a calendar user interface, the at least one retrieved task and the at least one retrieved appointment being adjacent and non-overlapping within the calendar user interface.

A non-transitory computer-readable storage medium may comprise instructions stored thereon for presenting tasks to facilitate performing the tasks by due dates. The instructions, when executed by at least one processor, may be configured to cause a computing system to at least retrieve tasks from a task database, each of the tasks including a task title, a task creation time, a task due date, a task done state, and a task completion date, and generate a calendar application. The calendar application may be configured to present at least one task that has a task done state of complete on a day corresponding to the task's task completion date, present at least one task that has a task done state of incomplete, and a task due date of a previous day, on a current day, present at least one task that has a task done state of incomplete, and a task due date of the current day, on the current day, and present at least one task that has a task done state of incomplete, and a task due date of a future day, on a day corresponding to the task's task due date.

A non-transitory computer-readable storage medium may comprise instructions stored thereon for presenting tasks in an email application and a calendar application. The instructions, when executed by at least one processor, may be configured to cause a computing system to at least generate an email application and generate a calendar application. The email application may be configured to retrieve multiple tasks from a task database, retrieve multiple emails from an email database, and concurrently present the multiple tasks and the multiple emails in an order based on dates determined for the multiple tasks and the multiple emails. The dates for each of the multiple emails may be determined based on an email received date. The dates for each of the multiple tasks may be determined by assigning, to tasks that have a task done state of complete, a day corresponding to the tasks' task completion dates, assigning a current date to tasks that have a task done state of incomplete and a task due date of a previous day, assigning the current date to tasks that have a task done state of incomplete and a task due date of the current date, and assigning the current date to tasks that have a task done state of incomplete and no task due date. The calendar application may be configured to retrieve the multiple tasks from the task database, retrieve multiple appointments from an appointment database, and concurrently present the tasks that have the task done state of complete on the days corresponding to the tasks' respective task completion dates, tasks that have the task done state of incomplete, and the task due date of the previous day, on the current day, tasks that have the task done state of incomplete, and the task due date of the current day, on the current day, and tasks that have the task done state of incomplete, and the task due date of a future day, on the days corresponding to the tasks' respective task due dates.

The details of one or more implementations are set forth in the accompanying drawings and the description below. Other features will be apparent from the description and drawings, and from the claims.

BRIEF DESCRIPTION OF THE DRAWINGS

FIG. 6 shows the email application presenting tasks and emails according to an example implementation.

FIG. 7 shows the calendar application presenting tasks and appointments according to an example implementation.

DETAILED DESCRIPTION

Figure 1:
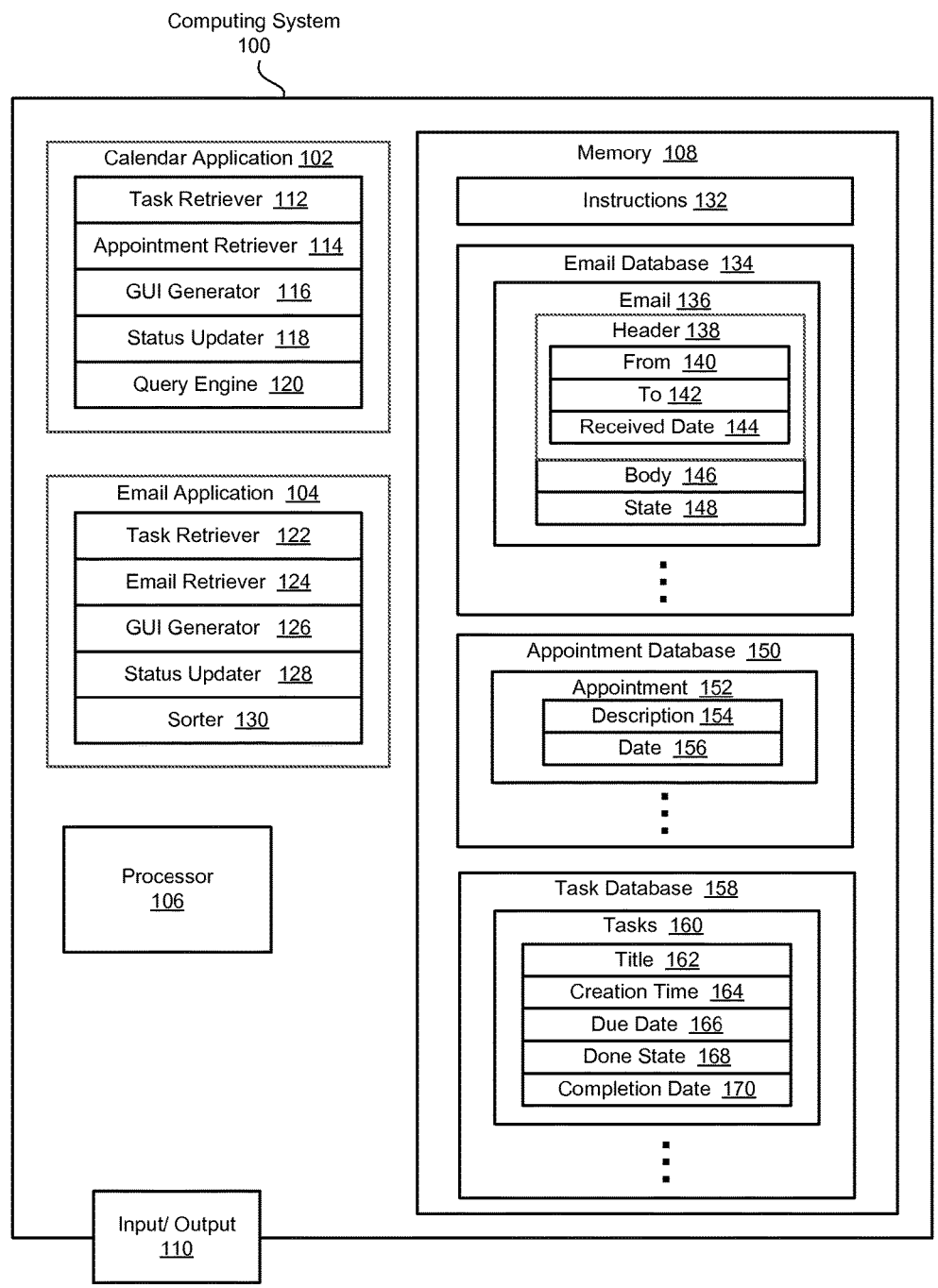
FIG. 1 is a diagram of a computing system for presenting tasks in an email application and in a calendar application according to an example implementation.

FIG. 1 is a diagram of a computing system 100 for presenting tasks in an email application and in a calendar application according to an example implementation. The computing system 100, which may include a desktop computer, a laptop computer, a tablet computer, a smartphone, or a networked system of devices that distributes the functions described herein, may include a calendar application 102, an email application 104, at least one processor 106 for executing instructions 132 stored in memory 108 to launch the calendar application 102 and email application 104, the at least one memory 108 storing instructions 132, an email database 134, and appointment database 150, and a task database 158, and one or more input/output modules 110. The calendar application 102 and email application 104 may read or retrieve from, and write to, the same task database 158, causing the fields, attributes, and/or status of the tasks to be synchronized between the calendar application 102 and the email application 104.

The calendar application 102 may present tasks and appointments to a user. The tasks and appointments may have been generated based on inputs from the user into a task application, the calendar application 102, and/or the email application 104, or may have been generated based on emails or other received communications.

The calendar application 102 may include a task retriever 112. The task retriever 112 may retrieve tasks, such as at least one task 160, from a task database 158 included in the at least one memory 108. The tasks 160 may each include any combination of a task title 162 describing the task 160, a task creation time 164 indicating a time at which the task 160 was created, a task due date 166 indicating a date on which the task 160 should be performed, a task done state 168 indicating whether the task 160 has been completed, and a task completion date 170 indicating when the task 160 was completed. If the task 160 does not have a due date, then the task due date 166 may be null and/or void. If the task 160 has not been completed, then the task completion date 170 may be null and/or void.

The calendar application 102 may also include an appointment retriever 114. The appointment retriever 114 may retrieve appointments, such as at least one appointment 152, from an appointment database 150 included in the at least one memory 108. The appointments 152 may include, for example, a description 154 describing the appointment, and a date 156 indicating the date and/or time of the appointment 152, which may include a start time and/or an end time.

The calendar application 102 may include a calendar graphical user interface (GUI) generator 116. The calendar GUI generator 116 may generate a calendar GUI for presentation to and interaction with a user. The GUI generator 116 may generate a calendar user interface such as a calendar interface 700, shown in FIG. 7, which presents tasks and appointments to the user. The calendar GUI may concurrently present at least one retrieved task 160 and/or multiple tasks, and at least one retrieved appointment 152 and/or multiple appointments to the user. The tasks 160 and appointments 152 may have, when presented by the calendar GUI, a same format and/or shape, such as all being rectangular, with same dimensions (length and width) or one of the dimensions varying based on the time duration of the appointment 152, and may be adjacent to each other and/or non-overlapping. Tasks 160 that have been completed may have visual indicators that they have been completed, such as by the text in the task 160 presented by the calendar GUI being lined through.

The calendar application 102 may include a status updater 118. The status updater 118 may update the status of tasks 160 and/or appointments 152. The status updater 118 may, for example, update the task done state 168 and/or the task completion date 170 of tasks 160 in response to user input into a calendar GUI.

The calendar application 102 may include a query engine 120. The query engine 120 may query tasks 160 stored in the task database 158 for tasks 160 that should be presented for a given day, such as the current day. In an example implementation, the query engine 120 may query the task database 158 for tasks that should be presented on a given day, such as the current day. Tasks that should be presented on a current day may include tasks for which the done state 168 is incomplete and have no due date and/or the due date 166 is null or void, tasks for which the done state is incomplete and the due date is a previous day, and tasks for which the done state is incomplete and the due date is the current day.

The query engine 120 may perform a query the first time the calendar application 102 is launched each day. The query may determine which tasks 160 to present for the current day by finding tasks that have the task done state 168 of incomplete and no due date 166, tasks that have the task done state 168 of incomplete and the task due date 166 of the previous day, and tasks 160 that have the task done state 168 of incomplete and the task due date 166 of the current day. For tasks 160 that are incomplete and have a same task due date 166, the tasks may be ordered and/or sorted based on their creation time 164. Tasks 160 that are incomplete may be sorted, ordered, and/or presented based on their task due dates 166, and tasks 160 that are incomplete and have same task due dates 166 may be ordered, sorted, and/or presented based on their creation times 164. In an example implementation, the calendar application 102 and/or query engine 120 may not perform, on a second or subsequent launch of the calendar application on a given day, the query to determine which tasks 160 to present for the current day.

The calendar application 102 may present tasks for which the done state 168 is complete on a date corresponding to the date identified by the completion date 170. The calendar application 102 may also present tasks for which the done state 168 is incomplete and the due date 166 is a future date on a date corresponding to the due date 166.

The email application 104 may present tasks 160 and emails 136 to a user. The emails 136 may have been received from an external email server, and may have been received via the Internet. The email application 104 may intersperse the tasks 160 and emails 136, and may present tasks 160 that should be performed on the current day near a top of a list of emails to increase the likelihood that the tasks that should be performed on the current day are seen and acted upon by the user.

The email application 104 may include a task retriever 122. The task retriever 122 may retrieve tasks 160 from the task database 158 included in the memory 108.

The email application 104 may include an email retriever 124. The email retriever 124 may retrieve emails 136 from the email database 134 included in the memory 108. The emails 136 may each include a header 138, a body 146, and a state 148. The header 138 may include, for example, a from field 140 identifying a sender of the email 136, a to field 142 identifying a recipient of the email 136, and a received date field 144 indicating a date on which the email 136 was received. The body 146 of the email 136 may include any text and/or attachments included in the email 136. The state 148 may indicate whether or not the email 136 has been read.

The email application 104 may include an email graphical user interface (GUI) generator 126. The email GUI generator 126 may generate an email GUI, or other user interface, for the user to view and provide input to emails and tasks. The GUI generator 126 may generate and present to the user, for example, an email user interface including an inbox such as the inbox 600 shown in FIG. 6. The email GUI may concurrently present at least one retrieved task 160 and/or multiple tasks, and at least one retrieved email 136 and/or multiple emails, to the user in a combined list. The tasks 160 and emails 136 may have, when presented by the email GUI, a same format and/or shape, such as all being rectangular, with same dimensions (length and width), and may be adjacent to each other and/or non-overlapping. Tasks 160 that have been completed may have visual indicators that they have been completed, such as by the text in the task 160 presented by the email GUI being lined-through.

The email application 104 may include a status updater 128. The status updater 128 may update the state 148 of emails 136 from unread to read in response to a user opening and/or reading an email, and/or may update the state 148 of emails 136 from read to unread in response to a user providing input for the email 136 to be marked unread. The status updater 128 may also update the done state 168 of tasks 160 from incomplete to complete in response to the user marking a task 160 as complete, or may update the done state 168 from complete to incomplete in response to other user input. When the status updater 128 updates the done state 168 of tasks 160, the status updater 128 may also update the completion date 170 to the current date to indicate that the task 160 was completed on the current date.

The email application 104 may include a sorter 130. The sorter 130 may sort an order of the emails 136 and tasks 160 for presentation within the inbox 600. The sorter 130 may sort the emails 136 and tasks 160 based on whether they have been read and completed, such as based on their read state 148 and done state 168. Emails that have not been read, and tasks that have not been completed, may be placed, ranked, sorted, ordered, and/or displayed higher than emails that have been read and tasks that have been completed, except that tasks that have not been completed but have a due date 166 of a future day may not be displayed and/or may not be included in the sorted list. For tasks 160 and emails 136 that have a same done state 168 or read state 148, the tasks 160 and emails 136 may be sorted based on the task due dates 166 of the tasks 160 and the received dates 144 of the emails 136. This sorting may cause unread emails received on the current day, and incomplete tasks with a due date of the current day or a previous day, to be ranked and/or displayed at the top of the list, maximizing the likelihood that the tasks will be completed and the emails will be read.

The computing system 100 may include the at least one processor 106. The at least one processor 106 may execute instructions, such as the instructions 132 stored in memory 108, to cause the computing system 100 to perform any combination of the methods, functions, or techniques described herein.

The computing system 100 may include at least one memory 108. The at least one memory 108 may include a non-transitory computer-readable storage medium. The at least one memory 108 may include instructions 132 stored thereon that, when executed by the at least one processor 106, cause the computing system 100 to perform any combination of the methods, functions, or techniques described herein.

The computing system 100 may include an email database 134. The email database 134 may store at least one, such as multiple, emails 136. The emails 136 may have been received by the computing system 100 from an email server via the Internet. The emails 136 may each include a header 138, a body 146, and a state 148. The header may include fields such as a from field 140, a to field 142, and a received date field 144. The body 146 may include text and any attachments included in the email 136. The state 148 may include a read state indicating whether the email 136 has been read or not.

The computing system 100 may include the appointment database 150. The appointment database 150 may include at least one, such as multiple, appointments 152. The appointments 152 may have been generated by the calendar application 102, such as based on user input into the calendar GUI. The appointments 152 may each include a description 154, which may include a description of the appointment 152, and a date 156, which may include a date and/or time, which may include a beginning date and/or time, and/or an ending date and/or time, of the appointment 152.

The computing system 100 may include a task database 158. The task database 158 may include one or more, such as multiple, tasks 160. Each task 160 may include any combination of a task title 162 describing the task 160, a task creation time 164 indicating a date and/or time at which the task 160 was created, a task due date 166 indicating a date and/or time at which the task 160 should be completed and/or performed, a task done state 168 indicating whether the task has been completed, and a task completion date 170 indicating a date and/or time at which the task 160 was completed.

While the email database 134, appointment database 150, and task database 158 have been described as being included in the computing system 100, any combination of the email database 134, appointment database 150, and task database 158 may be included in a remote storage system such as a remote or back-end server. Some of the emails 136 included in the email database 134, appointments 152 included in the appointment database 150, and/or tasks 160 included in the task database 158 may be transferred to local, main, and/or working memory of the computing system 100 in response to requests by the calendar application 102 and/or email application 104.

The computing system 100 may also include an input/output module 110. The input/output module 110 may include one or more input interfaces and one or more output interfaces. The input interfaces and output interfaces may include wired or wireless nodes for communicating with other computing systems, such as servers. The input interface(s) may include a keyboard, mouse, touchscreen, and/or microphone, as non-limiting examples. The output interface(s) may include a display and/or speaker, as non-limiting examples.

Figure 2:
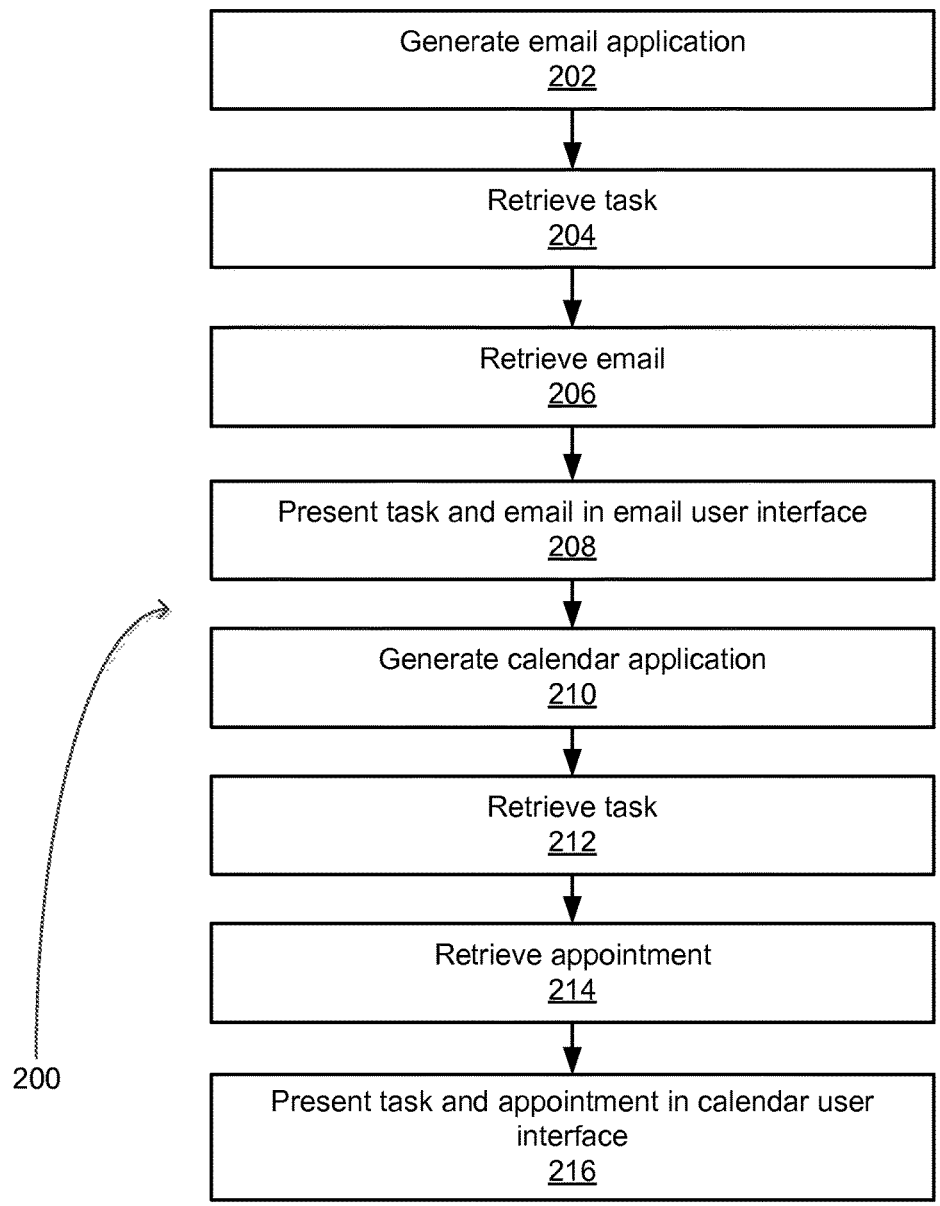
FIG. 2 is a flowchart of a method for presenting tasks in the email application and the calendar application according to an example implementation.

FIG. 2 is a flowchart of a method 200 for presenting tasks 160 in the email application 104 and the calendar application 102 according to an example implementation. The method 200 may be performed by the computing system 100.

According to an example implementation, the method 200 may include generating an email application 104 (202). The email application 104 may retrieve at least one task 160 from a task database 158 (204, retrieve at least one email 136 from an email database 134, and concurrently present the at least one retrieved task 160 and the at least one retrieved email 136 in an email user interface 600 (208). The at least one retrieved task 160 and the at least one retrieved email 136 may be adjacent and non-overlapping within the email user interface 600. The method 200 may also include generating a calendar application 102 (210). The calendar application 102 may retrieve the at least one task 160 from the task database 158 (212), retrieve at least one appointment 152 from an appointment database 150 (214), and concurrently present the at least one retrieved task 160 and the at least one retrieved appointment 152 in a calendar user interface 700 (216). The at least one retrieved task 160 and the at least one retrieved appointment 152 may be adjacent and non-overlapping within the calendar user interface 700.

According to an example implementation, the email application 104 may share the task database 158 with the calendar application 102, and the calendar application 102 may share the task database 158 with the email application 104.

According to an example implementation, the email application 104 may identify the at least one task 160 as a task with a task indicator instead of a sender indicator.

According to an example implementation, the at least one task 160 may include a task title 162, a task creation time 164, a task due date 166, a task done state 168, and a task completion date 170.

According to an example implementation, the at least one task 160 may include multiple tasks, each of the multiple tasks including a task title 162, a task creation time 164, a task due date 166, a task done state 168, and a task completion date 170. The email application 104 may sort the multiple tasks by task due date 166, and for tasks that have a same task due date 166, by task creation time 164.

According to an example implementation, the at least one task 160 may include a task title 162 describing the task 160, a task creation time 164 indicating a time at which the task 160 was created, a task due date 166 indicating a date on which the task 160 should be performed, a task done state 168 indicating whether the task 160 has been completed, and a task completion date 170 indicating when the task 160 was completed.

According to an example implementation, the at least one task 160 may include multiple tasks, each of the multiple tasks including a task due date 166 and a task done state 168, the at least one email 136 may include multiple emails, each of the multiple emails including an email received date 144 and an email read state 148. The email application 104 may sort the tasks and emails within a combined list based on the task done states 168 of the tasks and the email read states 148 of the emails, and for tasks and emails that have a same task done state 168 or email read state 148, based on the task due dates 166 of the tasks and the email received dates 144 of the emails.

According to an example implementation, the email application 104 may retrieve multiple tasks from the task database 158, retrieve multiple emails from the email database 134, and present the multiple tasks interspersed with the multiple emails in the email user interface 600.

According to an example implementation, the email application 104 may present the tasks in a same pane as the emails.

According to an example implementation, the email application 104 may present the tasks in an inbox 600 along with the emails.

According to an example implementation, the email application 104 may present the tasks that have a task due date 166 of a current day proximal to emails that have an email received date 144 of the current day.

According to an example implementation, the email application 104 may present the tasks that have not been completed proximal to emails that have an email received date 144 of a current day.

According to an example implementation, the email application 104 may present at least one task 160 that has been completed proximal to at least one email 136 that has an email received date 144 that is the same as a task completion date 170 of the task 160.

Figure 3:
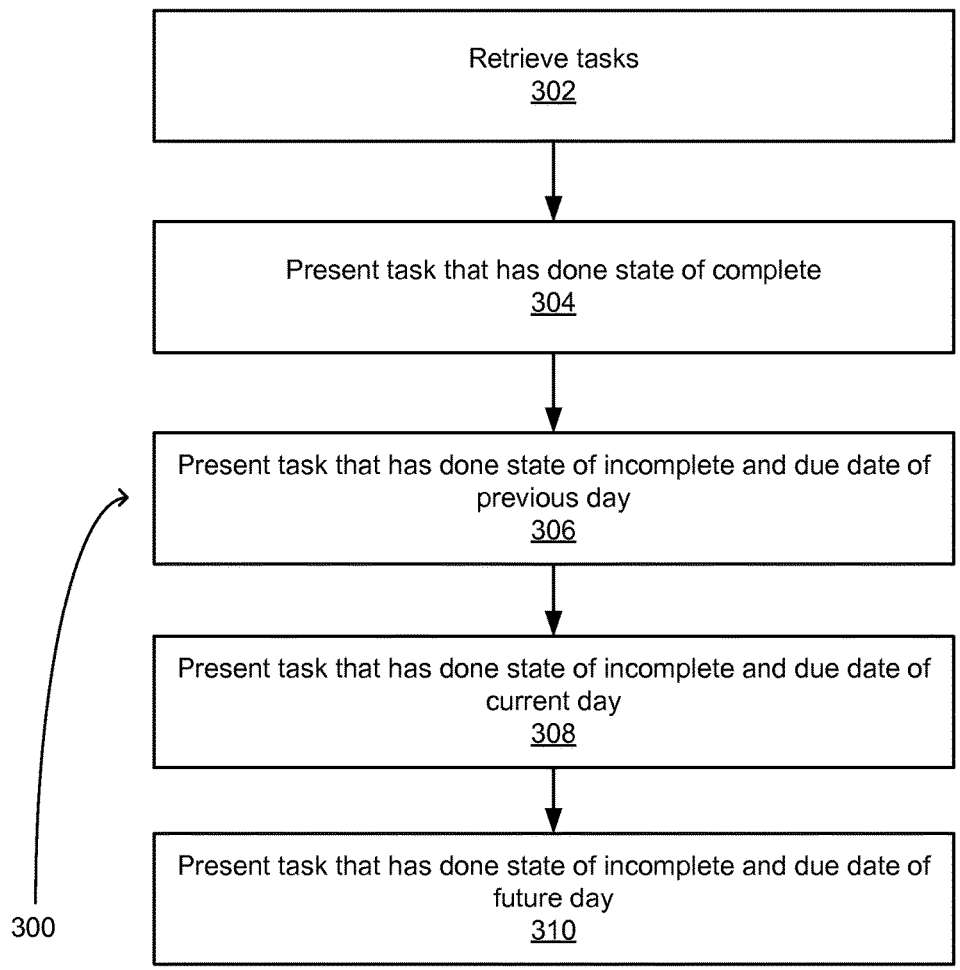
FIG. 3 is a flowchart of a method for presenting tasks to facilitate performing the tasks by due dates according to an example implementation.

FIG. 3 is a flowchart of a method 300 for presenting tasks 160 to facilitate performing the tasks 160 by due dates according to an example implementation. The method 300 may be performed by the computing system 100.

According to this example, the method 300 may include retrieving tasks from a task database 158 (302). Each of the tasks may include a task title 162, a task creation time 164, a task due date 166, a task done state 168, and a task completion date 170. The method 300 may also include generating a calendar application 102. The calendar application 102 may present at least one task 160 that has a task done state 168 of complete on a day corresponding to the task's 158 task completion date 170 (304), present at least one task 160 that has a task done state 168 of incomplete, and a task due date 166 of a previous day, on a current day (306), present at least one task 160 that has a task done state 168 of incomplete, and a task due date 166 of the current day, on the current day (308), and present at least one task 160 that has a task done state 168 of incomplete, and a task due date 166 of a future day, on a day corresponding to the task's 160 task due date 166 (310).

According to an example implementation, the calendar application 102 may present the tasks 160 on a timeline, the timeline including at least the previous day, the current day, and the future day.

According to an example implementation, the calendar application 102 may present at least one task 160 that has a task done state 168 of incomplete, and no due date 166, on the current day.

According to an example implementation, the calendar application 102 may perform a query a first time the calendar application 102 is launched each day, the query determining which tasks to present for the current day by finding tasks that have the task done state 168 of incomplete and no due date 166, tasks that have the task done 168 state of incomplete and the task due date 166 of the previous day, and tasks that have the task done state 168 of incomplete and the task due date 166 of the current day.

According to an example implementation, the calendar application 102 may not perform, on a second or subsequent launch of the calendar application 102 on a given day, the query determining which tasks to present for the current day.

According to an example implementation, an email application 104 may present at least one task that has a task done state 168 of incomplete, and a task due date 166 of a previous day, in an inbox 600, and present at least one task that has a task done state 168 of incomplete, and a task due date 166 of the current day, in the inbox 600.

According to an example implementation, the email application 104 may move, to an archive folder, tasks for which the task done state 168 is changed from incomplete to complete.

According to an example implementation, the calendar application 102 may be presented on a display.

Figure 4:
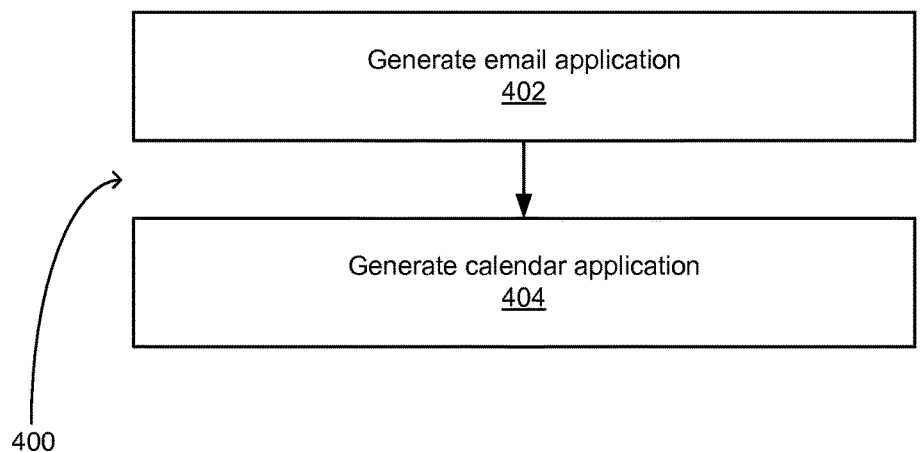
FIG. 4 is a flowchart of a method for presenting tasks in an email application and a calendar application according to an example implementation.

FIG. 4 is a flowchart of a method 400 for presenting tasks 160 in an email application 104 and a calendar application 102 according to an example implementation. The method 100 may be performed by the computing system 100.

The method 400 may include generating an email application 104 (402). The email application 104 may retrieve multiple tasks from a task database 158, retrieve multiple emails from an email database 134, and concurrently present the multiple tasks and the multiple emails in an order based on dates determined for the multiple tasks and the multiple emails. The dates for each of the multiple emails may be determined based on an email received date 144. The dates for each of the multiple tasks may be determined by assigning, to tasks that have a task done state of complete, a day corresponding to the tasks' task completion dates, assigning a current date to tasks that have a task done state 168 of incomplete and a task due date 166 of a previous day, assigning the current date to tasks that have a task done state 168 of incomplete and a task due date 166 of the current date, and assigning the current date to tasks that have a task done state 168 of incomplete and no task due date 166.

The method 400 may also include generating a calendar application 102 (404). The calendar application 102 may retrieve the multiple tasks from the task database 158, retrieve multiple appointments from an appointment database 150, and concurrently present the tasks that have the task done state 168 of complete on the days corresponding to the tasks' respective task completion dates 170, tasks that have the task done state 168 of incomplete, and the task due date 166 of the previous day, on the current day, tasks that have the task done state 168 of incomplete, and the task due date 166 of the current day, on the current day, and tasks that have the task done state 168 of incomplete, and the task due date 166 of a future day, on the days corresponding to the tasks' respective task due dates 166.

Figure 5:
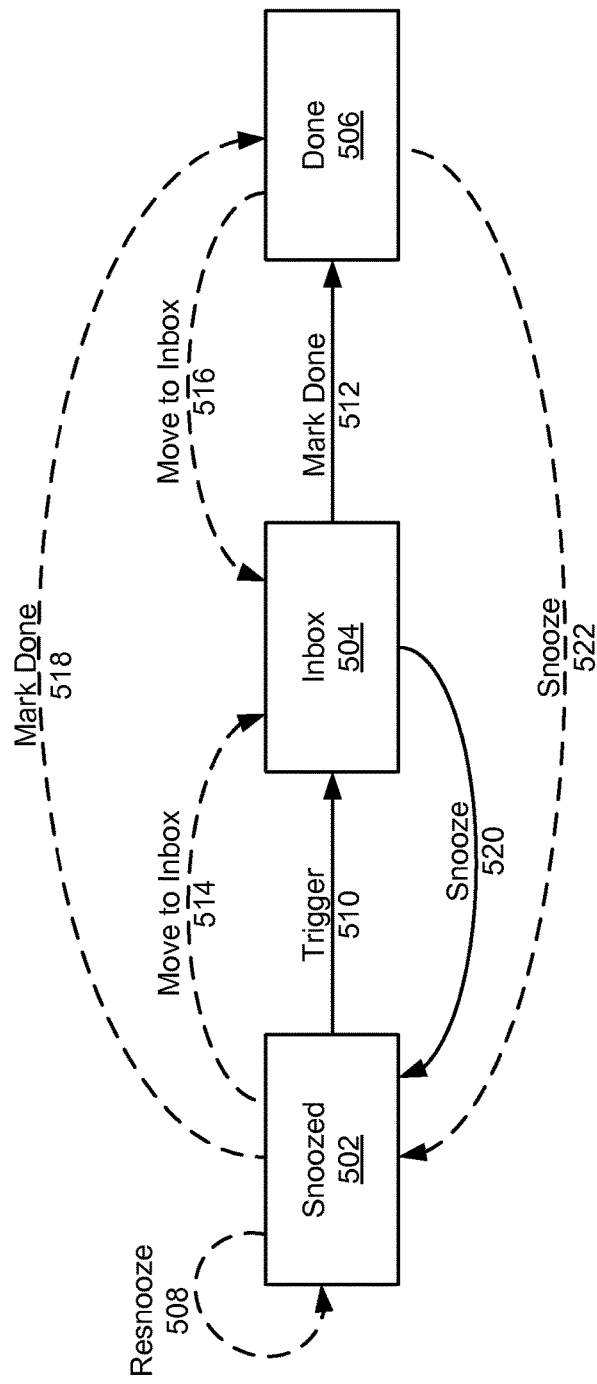
FIG. 5 is a state diagram showing states of a task according to an example implementation.

FIG. 5 is a state diagram showing states of a task 160 according to an example implementation. This diagram shows transitions of a task 160 presented by the email application 104 between a snoozed 502 state, presentation in an inbox 504, and a done 506 state. Any or all of these transitions may also be performed by the calendar application 102. The states of the task 160 may be changed, transitioned, and/or updated by the status updater 118 of the calendar application 102 and/or by the status updater 128 of the email application 104.

The email application 104 may delay presentation of tasks 160 that are snoozed 502 until a later time. A task 160 that is snoozed 502 may not be visible and/or presented by the email application 104. The later time may be a specified time, such as a certain number of minutes, hours, or days from a present time, or a specified date and time. A snoozed task 160 may be resnoozed 508 in response to user input, keeping the snoozed task in the snoozed 502 with a later time and/or date to come out of the snoozed 502 state.

In response to a trigger (510), such as the snooze time expiring, a date occurring, a date and time occurring, or the computing system 100 being in or near a specified location as determined by sensor input, the email application 104 may transition the task 160 out of the snoozed 502 state and present the task 160 in an inbox 504. The email application 104 may also present tasks 160 in the inbox 504 that have not been completed and have due dates of the current day, or have not been completed and have due dates of a previous day. The email application 104 may present the task 160 at or near a top of the inbox 504, and/or interspersed with or adjacent to emails 136 with a received date 144 of the current date, to maximize the likelihood that the user will see and perform the task 160. The email application 104 may also transition the task 160 from the snoozed 502 state to the inbox 504 in response to user input to move the task 160 to the inbox 504 (514). The email application 104 may also transition the task 160 from the snoozed 502 state to the done 506 state in which the task 160 will be presented interspersed with or adjacent to emails 136 with a received date 144 that is the same as the date on which the user marked the task 160 done (518) and/or is the same as the completion date 170 of the task 160, and/or may move the task 160 to an archive folder, in response to the user marking the task 160 as done (518). In an example in which the computing system 100 includes a touchscreen, the user may mark the task 160 as done (518) by swiping the task 160. A task 160 that is in the done 506 state may not be visible and/or presented by the email application 104.

A user may snooze (520) a task 160 that is in the inbox 504. In response to a snooze (520) input, the email application 104 may transition the task 160 from the inbox 504 to the snoozed 502 state, with a snooze time based on user input. The email application 104 may also transition the task 160 from the inbox 504 to the done 506 state, and/or may move the task 160 to an archive folder, in response to user input marking the task 160 as done (512). In an example in which the computing system 100 includes a touchscreen, the user may mark the task 160 as done (512) by swiping the task 160.

The email application 104 may transition a task 160 from the done 506 state to the inbox 516 in response to user input to move the task 160 to the inbox (516). The email application 104 may also transition the task 160 from the done 506 state to the snoozed 502 state in response to snooze (522) input from the user. The snooze (522) input may include either a time duration from the current time, or a specified time and/or date, at which the trigger (510) should cause the email application 104 to transition the task 160 from the snoozed 502 state to the inbox 504.

FIG. 6 shows the email application 104 presenting tasks 602, 604, 610, 614 and emails 606, 608, 612 according to an example implementation. The email application 104 may present the tasks 602, 604, 610, 614 and emails 606, 608, 612 interspersed within an email GUI such as an inbox 600. The inbox 600 may be included in a web browser, or in a local email application running on a client machine. The inbox 600 may include a single pane or box presenting the tasks 602, 604, 610, 614 and emails 606, 608, 612 in a vertical list in chronological order by received date and due date or completion date; the same pane or box may include all of the presented tasks 602, 604, 610, 614 and emails 606, 608, 612. The inbox 600 may correspond to, and/or have similar features and/or functionality to, the inbox 504 described above with respect to FIG. 5. Emails 606, 608, 612 may include sender indicators identifying a sender of the respective email 606, 608, 612, and tasks 602, 604, 610, 614 may include task indicators identifying the tasks 602, 604, 610, 614 as tasks.

The tasks 602, 604, 610, 614 may have similar features and/or functionality to the tasks 160 described above with respect to FIG. 1, such as titles 616, 622, 640, 652 corresponding to the task title 162, due dates 618, 624, 642, 654 corresponding to the task due dates 166, and done states 620, 626, 644, 656 corresponding to the task done states 168. The emails 606, 608, 612 may have similar features and/or functionality to the emails 136, such as titles 628, 634, 646 corresponding to subject lines which may be included in the email headers 138, dates 630, 636, 648 corresponding to the email received dates 144, and read states 632, 638, 650 corresponding to the read state 148.

The email application 104 may sort the tasks 602, 604, 610, 614 and emails 606, 608, 612 first based on done state 620, 626, 644, 656 and read state 632, 638, 650. The tasks 602, 604, 610, 614 that have a done state 620, 626, 644, 656 of false and/or which have not been completed, and emails 606, 608, 612 that have a read state 632, 638, 656 of false and/or which have not been read or opened, may be ranked higher and/or sorted into a higher position, and/or displayed closer to the top of the inbox 600, than tasks 602, 604, 610, 614 that have a done state 620, 626, 644, 656 of true and/or which have been completed, and emails 606, 608, 612 that have a read state 632, 638, 650 of true and/or which have been read. Among tasks 602, 604, 610, 614 that have a same done state 620, 626, 644, 656 and emails 606, 608, 612 that have a same read state 632, 638, 656, the tasks 602, 604, 610, 614 and emails 606, 608, 612 may be sorted based on their dates 618, 624, 630, 636, 642, 648, 654. Among tasks 602, 604, 610, 614 that have a same done state and a same due date 618, 624, 630, 636, 642, 648, 654, the tasks 602, 604, 610 may be sorted based on their respective creation times 164. Ranking and/or presenting tasks 602, 604, that have not been completed and have due dates 618, 624 of the current day or a previous day, higher in the inbox 600, may increase the likelihood that the tasks 602, 604 will be seen and acted upon by the user.

In an example implementation, the tasks 602, 604, 610, 614 and/or emails 606, 608, 612 may be separated into sections or panes based on their respective states of snoozed 502, inbox 604, or done 506, as described above with respect to FIG. 5. All of the tasks 602, 604, 610, 614 and/or emails 606, 608, 612 in the snoozed 502 state may be included in a first section or pane, all of the tasks 602, 604, 610, 614 and/or emails 606, 608, 612 in the inbox 504 state may be included in a second section or pane different than the first section or pane, and all of the tasks 602, 604, 610, 614 and/or emails 606, 608, 612 in the done 506 state may be included in a third section or pane different than the first and second sections or panes. The tasks 602, 604, 610, 614 and/or emails 606, 608, 612 in the snoozed 502 state may be ranked by received date 144 or due date 166, the tasks 602, 604, 610, 614 and/or emails 606, 608, 612 in the inbox 504 state may be ranked by received date 144 or due date 166 and/or creation time 164, and the tasks 602, 604, 610, 614 and/or emails 606, 608, 612 in the done 506 state may be ranked by their received date 144 or completion date 170.

FIG. 7 shows the calendar application 102 presenting tasks 708, 712, 714, 716, 718, 722 and appointments 710, 720, 724 according to an example implementation. The calendar application 102 may present the tasks 708, 712, 714, 716, 718, 722 and appointments 710, 720, 724 within a calendar interface 700 generated by the GUI generator 116 of the calendar application 102. The calendar interface 700 may be included in a web browser, or in a local calendar application running on a local machine. The calendar interface 700 may display all of the tasks 708, 712, 714, 716, 718, 722 and appointments 710, 720, 724 in a single pane or box; the single pane or box may include sub-panes or sub-boxes corresponding to the current day 704, one or more previous days 702, and one or more future days 706. The sub-panes or sub-boxes may form a timeline with the one or more previous days 702, the current day 704, and the one or more future days 706. The tasks 708, 712, 714, 716, 718, 722 may correspond to the tasks 160 stored in the task database 158, and the appointments 710, 720, 724 may correspond to the appointments 152 stored in the appointment database 150.

The calendar application 102 may display, for each of the tasks 708, 712, 714, 716, 718, 722, titles 726, 736, 742, 748, 754, 764 corresponding to the titles 162 stored in the task database 158, dates 728, 738, 744, 750, 756, 766 corresponding to the due dates 166 stored in the task database 158 for tasks 708, 712, 714, 716, 718, 722 that have not been completed and corresponding to the completion dates 170 for tasks 708, 712, 714, 716, 718, 722 that have been completed, and done states 730, 740, 746, 752, 758, 768 corresponding to the task done states 168 stored in the task database 158. The calendar application 102 may display, for each of the appointments 710, 720, 724, a title 732, 760, 770 corresponding to the appointment description 154 stored in the appointment database 150, and a date 734, 762, 772 corresponding to the date 156 stored in the appointment database 150.

The calendar application 102 may present the appointments 710, 720, 724 on days corresponding to the date 734, 762, 772 associated with the respective appointments 710, 720, 724. For example, for an appointment 710 with a date 734 corresponding to a previous day 702 (which may be one or more days before a current day 704), the calendar application 102 may display the appointment 710 in a box, pane, or section of the calendar interface 700 associated with the previous day 702. For an appointment 720 with a date 762 corresponding to the current day 704, the calendar application 102 may display the appointment 720 in a box, pane, or section of the calendar interface 700 associated with the current day 704. For an appointment 724 with a date 772 corresponding to a future day 706 (which may be one or more days after the current day 704), the calendar application 102 may display the appointment 724 in a box, pane, or section of the calendar interface 700 associated with the future day 706.

For a task 708 that has been completed with a completion date 170, 728 on the previous day 702, the calendar application 102 may present the task 708 in a box, pane, or section of the calendar interface 700 associated with the previous day 702. The box, pane, or section of the calendar interface 700 associated with the previous day 702 may include the task 708 and appointment 710.

For a task 712 that has not been completed and does not have a due date 166, the calendar application 102 may present the task 712 in a box, pane, or section of the calendar interface 700 associated with the current day 704, displaying the current day as the date 738. For a task 714 that have not been completed and that has a due date 744 of the current day 704, the calendar application 102 may display the task 714 in a box, pane, or section of the calendar interface 700 associated with the current day 704. For a task 716 that has not been completed and has a due date 166 of the previous day 702, the calendar application 102 may assign the current day 704 as the date 750 of the task 716, and display the task 716 in a box, pane, or section of the calendar interface 700 associated with the current day 704. For a task 718 that has been completed with a completion date 170 of the current day 704, the calendar application 102 may display the task 718 in a box, pane, or section of the calendar interface 700 associated with the current day 704, with the current day displayed as the date 756. The box, pane, or section of the calendar interface 700 associated with the current day 704 may include the tasks 712, 714, 716, 718 and appointment 720.

For a task 722 that has a due date 728 on the future day 706, the calendar application 102 may present the task 722 in a box, pane, or section of the calendar interface 700 associated with the future day 706. The box, pane, or section of the calendar interface 700 associated with the future day 706 may include the task 722 and the appointment 724.

Figure 8:
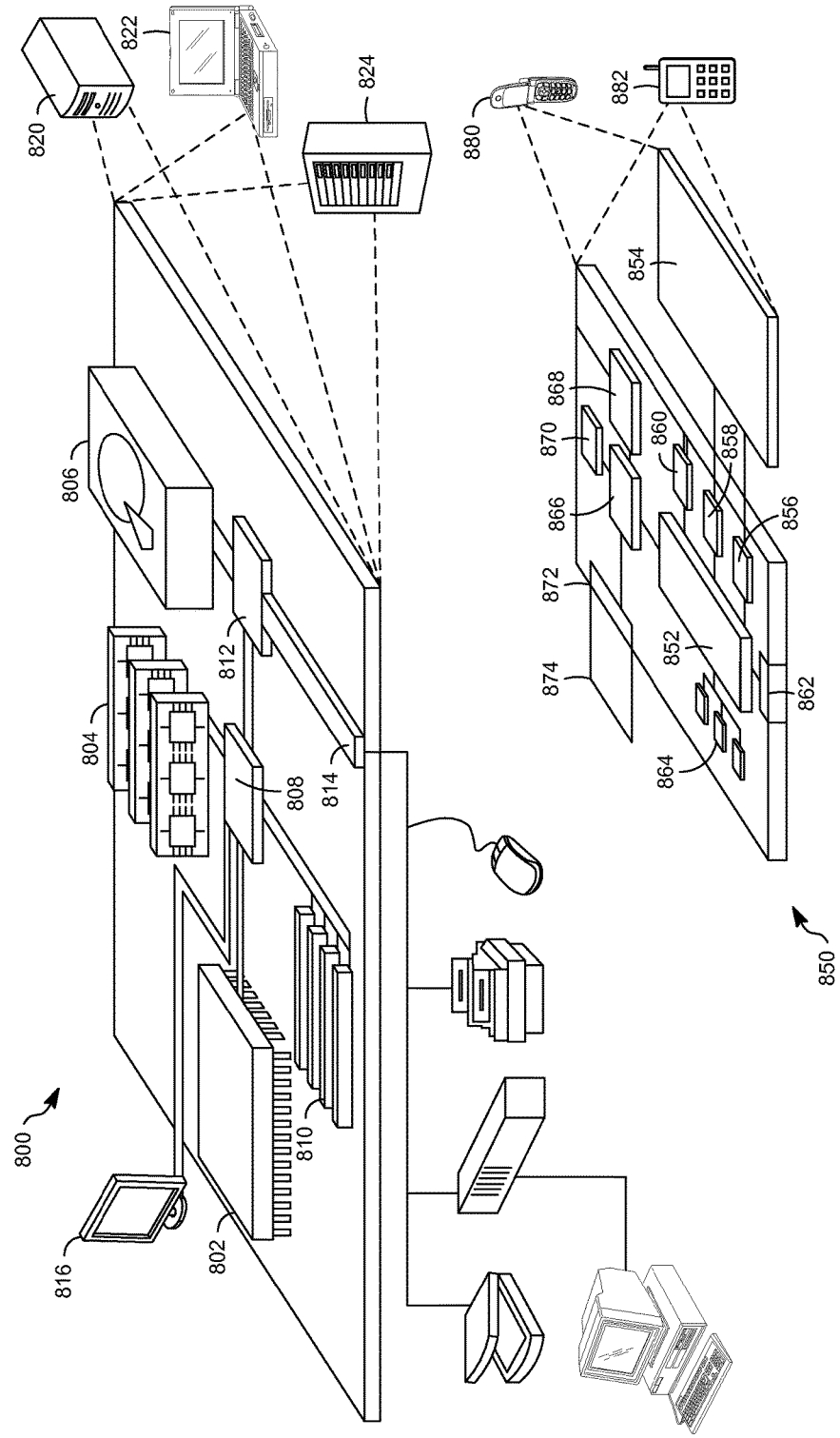
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for presenting tasks in an email application and a calendar application, the instructions, when executed by at least one processor, being configured to cause a computing system to at least:
 generate an email application, the email application performing:
  retrieving at least one task from a task database;
  retrieving at least one email from an email database;
  sorting the tasks and emails within a combined list based on:
   at least one task done state of the at least one task and at least one email read state of the at least one email; and
   for tasks and emails that have a same task done state or email read state, based on task due dates of the tasks and email received dates of the emails; and
  concurrently presenting the at least one retrieved task and the at least one retrieved email in an email user interface in an order based on the sorting and presenting at least one task that should be performed on a current day at a top of the email user interface, the at least one retrieved task and the at least one retrieved email being adjacent and non-overlapping within the email user interface; and generate a calendar application, the calendar application performing:
retrieving the at least one task from the task database;
retrieving at least one appointment from an appointment database; and
concurrently presenting the at least one retrieved task and the at least one retrieved appointment in a calendar user interface, the at least one retrieved task and the at least one retrieved appointment being adjacent and non-overlapping within the calendar user interface.

2. The non-transitory computer-readable storage medium of claim 1, wherein:
the email application shares the task database with the calendar application; and
the calendar application shares the task database with the email application.

3. The non-transitory computer-readable storage medium of claim 1, wherein the email application identifies the at least one task as a task with a task indicator instead of a sender indicator.

4. The non-transitory computer-readable storage medium of claim 1, wherein the at least one task includes:
a task title;
a task creation time;
a task due date;
a task done state; and
a task completion date.

5. The non-transitory computer-readable storage medium of claim 1, wherein:
the at least one task includes multiple tasks, each of the multiple tasks including:
a task title;
a task creation time;
a task due date;
a task done state; and
a task completion date; and
the email application is configured to sort the multiple tasks by task due date, and for tasks that have a same task due date, by task creation time.

6. The non-transitory computer-readable storage medium of claim 1, wherein the at least one task includes:
a task title describing the task;
a task creation time indicating a time at which the task was created;
a task due date indicating a date on which the task should be performed;
a task done state indicating whether the task has been completed; and
a task completion date indicating when the task was completed.

7. The non-transitory computer-readable storage medium of claim 1, wherein:
the at least one task includes multiple tasks, each of the multiple tasks including a task due date and a task done state;
the at least one email includes multiple emails, each of the multiple emails including an email received date and an email read state; and
the email application sorts the multiple tasks and multiple emails within the combined list based on:
the task done states of the multiple tasks and the email read states of the multiple emails; and
for tasks and emails that have a same task done state or email read state, based on the task due dates of the tasks and the email received dates of the emails.

8. The non-transitory computer-readable storage medium of claim 1, wherein the email application performs:
retrieving multiple tasks from the task database;
retrieving multiple emails from the email database; and
presenting the multiple tasks interspersed with the multiple emails in the email user interface.

9. The non-transitory computer-readable storage medium of claim 1, wherein the email application presents the tasks in a same pane as the emails.

10. The non-transitory computer-readable storage medium of claim 1, wherein the email application presents the tasks in an inbox along with the emails.

11. The non-transitory computer-readable storage medium of claim 1, wherein the email application presents the tasks that have a task due date of a current day proximal to emails that have an email received date of the current day.

12. The non-transitory computer-readable storage medium of claim 1, wherein the email application presents the tasks that have not been completed proximal to emails that have an email received date of a current day.

13. The non-transitory computer-readable storage medium of claim 1, wherein the email application presents at least one task that has been completed proximal to at least one email that has an email received date that is the same as a task completion date of the task.

14. A non-transitory computer-readable storage medium comprising instructions stored thereon for presenting tasks in an email application and a calendar application, the instructions, when executed by at least one processor, being configured to cause a computing system to at least:
generate an email application, the email application performing:
retrieving multiple tasks from a task database;
retrieving multiple emails from an email database;
sorting the tasks and emails within a combined list based on:
at least one task done state of the at least one task and an email read state of the at least one email; and
for tasks and emails that have a same task done state or email read state, based on task due dates of the tasks and email received dates of the emails; and
concurrently presenting the multiple tasks and the multiple emails in an order based on the sorting, at least one task that should be performed on a current day being presented at a top, the dates for each of the multiple emails being determined based on an email received date, the dates for each of the multiple tasks being determined by:
assigning, to tasks that have a task done state of complete, a day corresponding to task completion dates of the tasks;
assigning a current date to tasks that have a task done state of incomplete and a task due date of a previous day;
assigning the current date to tasks that have a task done state of incomplete and a task due date of the current date; and
assigning the current date to tasks that have a task done state of incomplete and no task due date;
generate a calendar application, the calendar application performing:
retrieving the multiple tasks from the task database;
retrieving multiple appointments from an appointment database; and concurrently presenting:
- the tasks that have the task done state of complete on the days corresponding to the respective task completion dates of the tasks;
- tasks that have the task done state of incomplete, and the task due date of the previous day, on the current day;
- tasks that have the task done state of incomplete, and the task due date of the current day, on the current day; and
- tasks that have the task done state of incomplete, and the task due date of a future day, on the days corresponding to the respective task due dates of the tasks.

15. A method performed by a computing system, the method comprising:

generating an email application, the email application performing:

retrieving at least one task from a task database;

retrieving at least one email from an email database;

sorting the tasks and emails within a combined list based on:
- at least one task done state of the at least one task and at least one email read state of the at least one email; and
- for tasks and emails that have a same task done state or email read state, based on task due dates of the tasks and email received dates of the emails; and concurrently presenting the at least one retrieved task and the at least one retrieved email in an email user interface in an order based on the sorting and presenting at least one task that should be performed on a current day at a top of the email user interface, the at least one retrieved task and the at least one retrieved email being adjacent and non-overlapping within the email user interface; and generating a calendar application, the calendar application performing:

retrieving the at least one task from the task database;

retrieving at least one appointment from an appointment database; and concurrently presenting the at least one retrieved task and the at least one retrieved appointment in a calendar user interface, the at least one retrieved task and the at least one retrieved appointment being adjacent and non-overlapping within the calendar user interface.

* * * * *